(12) United States Patent
Hall (10) Patent No.: US 12,333,344 B2
(45) Date of Patent: Jun. 17, 2025

(54) TECHNIQUES FOR SEGMENTATION OF DATA PROCESSING WORKFLOWS BETWEEN INSTRUMENT SYSTEMS AND ASSOCIATED COMPUTING DEVICES

(71) Applicant: THERMO FINNIGAN LLC, San Jose, CA (US)

(72) Inventor: Trevor Hall, San Jose, CA (US)

(73) Assignee: Thermo Finnigan LLC, San Jose, CA (US)

( * ) Notice: Subject to any disclaimer, the term of this patent is extended or adjusted under 35 U.S.C. 154(b) by 142 days.

(21) Appl. No.: 18/166,914

(22) Filed: Feb. 9, 2023

(65) Prior Publication Data

US 2024/0272956 A1 Aug. 15, 2024

(51) Int. Cl.
*G06F 9/50* (2006.01)
*G06F 9/445* (2018.01)
*G06F 16/2455* (2019.01)

(52) U.S. Cl.
CPC ........ *G06F 9/5061* (2013.01); *G06F 9/44505* (2013.01); *G06F 16/2455* (2019.01)

(58) Field of Classification Search
CPC .. G06F 9/445; G06F 9/44505; G06F 9/44521; G06F 9/44526
See application file for complete search history.

(56) References Cited

U.S. PATENT DOCUMENTS

| | | | |
|---|---|---|---|
| 7,337,256 B2 * | 2/2008 | Korowitz | G05B 19/0423 710/63 |
| 10,693,737 B1 * | 6/2020 | Teflian | H04L 41/12 |
| 2003/0036876 A1 * | 2/2003 | Fuller, III | G06Q 30/0601 702/127 |
| 2012/0310548 A1 * | 12/2012 | Takahashi | G06F 3/04842 702/24 |
| 2016/0356801 A1 * | 12/2016 | Glavina | G01N 35/00623 |
| 2021/0125275 A1 * | 4/2021 | Adibi | G06Q 40/03 |
| 2021/0133805 A1 * | 5/2021 | Adibi | G06Q 30/0204 |
| 2021/0384024 A1 | 12/2021 | Carney et al. | |

* cited by examiner

*Primary Examiner* — Raymond N Phan (57) ABSTRACT

Aspects of systems, methods, algorithms, and non-transitory media storing computer-readable instructions for segmenting data processing workflows are provided. In a first aspect, a computer-implemented method for segmenting data processing workflows includes determining a configuration of an instrument system. The instrument system can include an analytical instrument coupled with an instrument PC (IPC). The IPC can be configured to receive raw data from the analytical instrument, to process the raw data, and to communicate with a client computing device coupled with the instrument system. The method can also include segmenting a data process workflow based at least in part on the configuration, attributing at least a subset of constituent operations of the data process workflow to the client computing device or the IPC.

18 Claims, 7 Drawing Sheets

TECHNIQUES FOR SEGMENTATION OF DATA PROCESSING WORKFLOWS BETWEEN INSTRUMENT SYSTEMS AND ASSOCIATED COMPUTING DEVICES

TECHNICAL FIELD

Embodiments of the present disclosure are directed to analytical instrument systems, as well as algorithms and methods for their operation. In particular, some embodiments are directed toward data processing workflow segmentation.

BACKGROUND

Chemical analysis of samples using a mass spectrometer (MS) typically includes at least partially ionizing a sample, and measuring the ratio of mass to charge of the ions produced. A mass spectrum describes intensity of a detector signal as a function of mass-to-charge (M/Z) ratio. Constituent species are identified by comparing parent ion mass values and decomposition signatures that can be characteristic of specific elements and molecular structures. In a mass spectrometer (MS) instrument, detailed information can be developed for elemental composition, molecular structure, and other characteristics of the samples (e.g., oxidation state, etc.), by processing raw spectrum data in various ways.

An analytical instrument, such as a gas chromatograph—mass spectrometer (GC-MS), can be configured to process multiple samples sequentially, for example, through the use of an auto sampler and control software that enables the instrument to generate analytical spectrum data on a semi-continuous basis. In conventional systems, instruments are controlled by an instrument PC (IPC) that is directly connected to the instrument, for example, via a serial connector (e.g., USB-type serial bus connector). The IPC executes the control software, facilitates user interaction with the instrument (e.g., via a user interface), and stores analytical spectrum data locally. Typically, an analytical spectrum data set, which can be multi-dimensional (referred to as a "data cube," or the like), is a large-format data volume that can occupy 10 GB or more of local storage at the current data standard. As detectors and other instrument components improve, it is anticipated that datafile size will continue to increase over time.

Data processing workflows are typically executed on the IPC by processing local datafiles using one or more applications accessible via a user interface of the IPC. Alternatively, analytical spectrum datafiles can be processed on client computing devices, such as laptops, after transferring the datafiles. Processing data directly on an IPC draws compute resources that could otherwise be dedicated to sample analysis operations, introducing latency into sample analysis and data processing workflows. Similarly, transferring sets of analytical spectrum datafiles introduces network connectivity as a source of latency in data processing workflows. There is a need, therefore, for segmentation of data processing workflows between IPCs and client computing devices that reduces latencies and preserves compute resources for sample analysis.

SUMMARY

Aspects of systems, methods, algorithms, and non-transitory media storing computer-readable instructions for segmenting data processing workflows are provided. In a first aspect, a computer-implemented method for segmenting data processing workflows includes determining a configuration of an instrument system. The instrument system can include an analytical instrument coupled with an instrument PC (IPC). The IPC can be configured to receive raw data from the analytical instrument, to process the raw data, and to communicate with a client computing device coupled with the instrument system. The method can also include segmenting a data process workflow based at least in part on the configuration, attributing at least a subset of constituent operations of the data process workflow to the client computing device or the IPC.

Segmenting the data process workflow can include defining a first subset of operations of the data process workflow. The first subset of operations can be executed locally on the IPC using the raw data. Segmenting the data process workflow can also include defining a second subset of operations of the data process workflow. The second subset of operations can be executed locally on the client computing device using processed data transferred to the client computing device from the instrument system. The raw data can include analytical spectrum data. The first subset of operations can include implementing one or more spectral analysis algorithms configured to input at least a portion of the raw data and to output the processed data. The processed data can include compressed spectrum data and spectral analysis metadata. The second subset of operations can include, in accordance with receiving a user action via an interactive user environment, initiating a data processing operation of the first subset of operations.

In some embodiments, determining the configuration of the instrument system includes generating a set of parameters describing components of the instrument system, the parameters describing hardware included in the instrument system being configured to process data or to transfer data between two or more components of the instrument system. Determining the configuration of the instrument system can include determining a data processing latency for the instrument system using the set of parameters, determining a data transfer latency for the instrument system using the set of parameters, or determining a network latency between the client computing device and the instrument system. Determining the data processing latency can include querying a database storing data processing capacity information for hardware. Determining the data transfer latency can include querying a database storing data transfer capacity information for the hardware. Determining the network latency can include assessing a data transfer rate between the client computing device and the instrument system.

In some embodiments, the method further includes generating an updated configuration of the instrument system, generating an updated latency parameter using the updated configuration, and modifying the segmented data process workflow using the updated latency parameter. The instrument system can further include an application specific machine (ASM), operably coupled with the IPC and the client computing device. Segmenting the data process workflow can further include attributing at least a third subset of the operations included in the data process workflow to the ASM.

In a second aspect, a system includes a client computing device and an instrument system. The instrument system can include an analytical instrument and an instrument PC (IPC). The instrument system can further include an application specific machine (ASM). The client computing device can communicate with the instrument system via a network. The client computing device, the IPC, and/or the ASM can be configured to implement one or more operations of the method of the first aspect. The client computing device, the IPC, and/or the ASM can be configured to implement the one or more operations of the method of the first aspect via an interactive user environment configured to receive user input.

In a third aspect, one or more non-transitory machine-readable storage media store instructions that, when executed by a machine, cause the machine to perform operations for segmenting data processing workflows, the operations including one or more operations of the method of the first aspect. The machine can be or include one or more components of the system of the second aspect.

BRIEF DESCRIPTION OF THE DRAWINGS

The foregoing aspects and many of the attendant advantages of the present disclosure will become more readily appreciated as the same become better understood by reference to the following detailed description, when taken in conjunction with the accompanying drawings.

In the drawings, like reference numerals refer to like parts throughout the various views unless otherwise specified. Not all instances of an element are necessarily labeled to reduce clutter in the drawings where appropriate. The drawings are not necessarily to scale, emphasis instead being placed upon illustrating the principles being described.

DETAILED DESCRIPTION

While illustrative embodiments have been illustrated and described, it will be appreciated that various changes can be made therein without departing from the spirit and scope of the disclosure. Embodiments of the present disclosure focus on mass spectrometry and related instruments in the interest of simplicity of description. To that end, embodiments are not limited to such instruments, but rather are contemplated for analytical instrument systems more generally, as where one or more instruments can form a part of systems of instruments, networks, and computing devices where compute and network resources can be constrained.

Chemical analysis of samples using a mass spectrometer (MS), typically includes at least partially ionizing a sample, and measuring the ratio of mass to charge of the ions produced. A mass spectrum describes intensity of a detector signal as a function of mass-to-charge (M/Z) ratio. Constituent species are identified by comparing parent ion mass values and decomposition signatures that can be characteristic of specific elements and molecular structures. In a mass spectrometer (MS) instrument, detailed information can be developed for elemental composition, molecular structure, and other characteristics of the samples (e.g., oxidation state, etc.), by processing raw spectrum data in various ways.

An analytical instrument, such as a gas chromatograph—mass spectrometer (GC-MS), can be configured to process multiple samples sequentially, for example, through the use of an auto sampler and control software that enables the instrument to generate analytical spectrum data on a semi-continuous basis. In conventional systems, instruments are controlled by an instrument PC (IPC) that is directly connected to the instrument, for example, via a serial connector (e.g., USB-type serial bus connector). The IPC executes the control software, facilitates user interaction with the instrument (e.g., via a user interface), and stores analytical spectrum data locally. An analytical spectrum dataset, which can be multi-dimensional (referred to as a "data cube," or the like), can be or include a set of large-format files that can occupy 10 GB or more of local storage at the current data standard. As detectors and other instrument components improve, it is anticipated that datafile size will continue to increase over time.

Data processing workflows are typically executed on the IPC by processing local datafiles using one or more applications accessible via a user interface of the IPC. Alternatively, analytical spectrum datafiles can be processed on client computing devices, such as laptops, after transferring the datafiles. Processing data directly on an IPC draws away compute resources that could otherwise be dedicated to sample analysis operations, leading to overspecification of IPC hardware and introducing latency into data processing workflows. Similarly, transferring sets of analytical spectrum datafiles introduces network connectivity as a source of latency in data processing workflows. There is a need, therefore, for segmentation of data processing workflows between IPCs and client computing devices that reduces latencies and preserves compute resources for sample analysis (e.g., operation of the analytical instrument(s) and/or instrument system(s)).

To that end, embodiments of the present disclosure include systems, methods, algorithms, and non-transitory media storing computer-readable instructions for segmenting data processing workflows. In an illustrative example, a method can include determining a configuration of an instrument system, where the instrument system includes an analytical instrument coupled with an instrument PC (IPC). The IPC can be configured to receive raw data from the analytical instrument, to process the raw data, and/or to communicate with a client computing device coupled with the instrument system. The method can also include segmenting a data process workflow based at least in part on the configuration, where the segmented data process workflow can attribute at least a subset of constituent operations of the data process workflow to the client computing device or the IPC. In this way, the segmented data process workflow can reduce overall latency of the constituent operations while also preserving compute resources of the IPC(s) for sample preparation and data generation, among other instrument control processes.

The following detailed description focuses on embodiments of gas chromatography—mass spectrometer (GC-MS) systems, but it is contemplated that additional and/or alternative instrument systems can be improved through the use of the techniques described. In an illustrative example, instrument systems can include analytical instruments configured to generate analytical spectrum data (e.g., mass spectrometry, emission spectrometry, absorption spectrometry, nuclear magnetic resonance spectrometry, Raman spectrometry, infrared spectrometry, confocal imaging, hyperspectral imaging, MRI, x-ray imaging and microanalysis, optical microscopy, charged particle microscopy, quartz-crystal microbalance, electrochemical spectrometry, x-ray spectrometry, chromatography, next-gen sequencing, or the like). In the context of the present disclosure, a "data cube" refers to data arrays that can include hierarchically organized spectra including, but not limited to, spatially referenced spectra, temporally referenced spectra, elution referenced spectra, energy referenced spectra, etc. In this way, embodiments of the present disclosure can include instrument systems for which an analytical instrument can be configured to take in a sample and generate a datafile. In turn, the datafile can be processed to generate identifier information descriptive of the physical, chemical, and/or biological nature of the sample.

Figure 1:
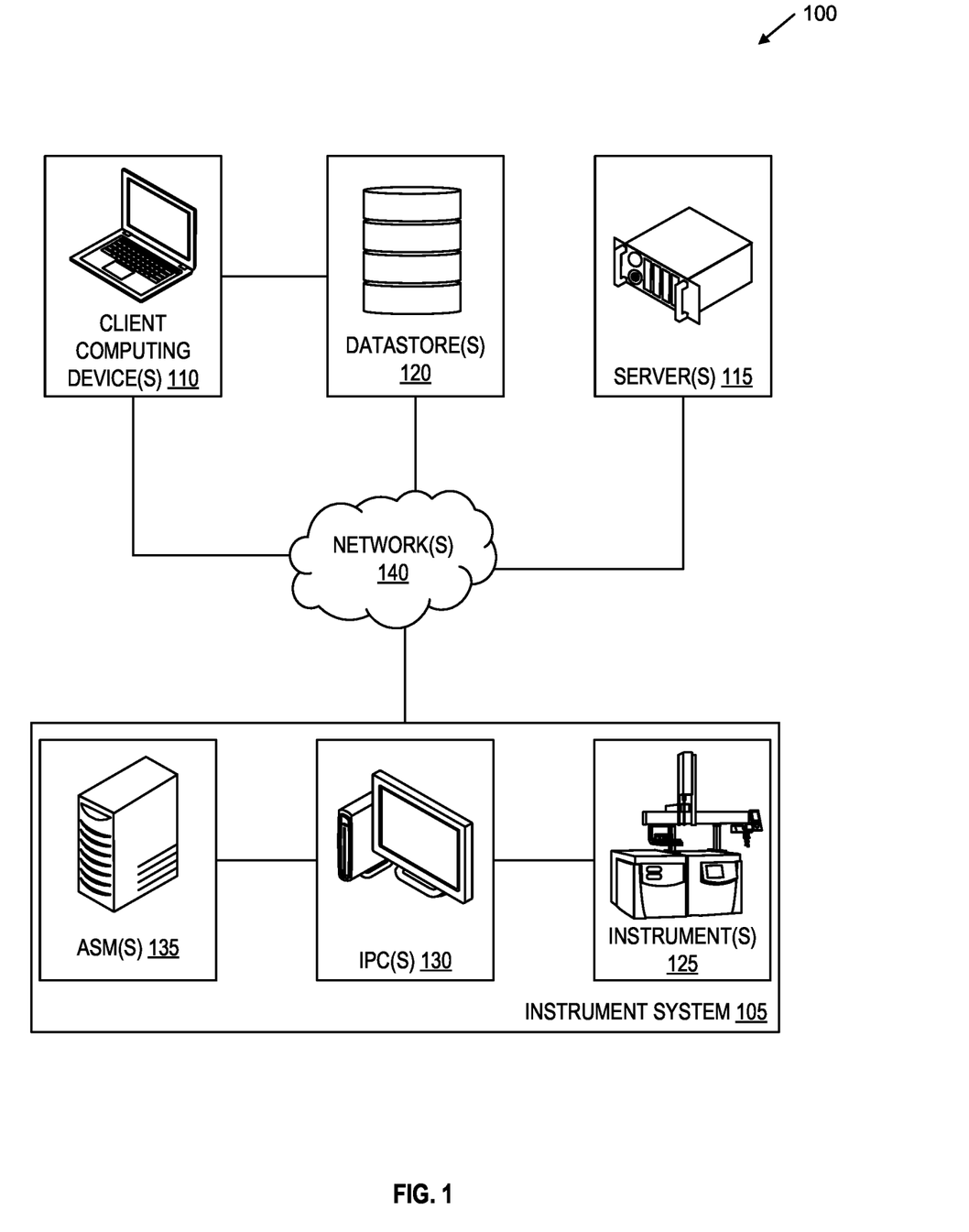
FIG. 1 is a schematic diagram illustrating an example analytical data system, in accordance with some embodiments of the present disclosure.

FIG. 1 is a schematic diagram illustrating an example analytical data system 100, in accordance with some embodiments of the present disclosure. The example system 100 can include one or more instrument systems 105, one or more client computing devices 110, one or more servers 115, and/or one or more datastores 120. The instrument system(s) 105 can include one or more analytical instruments 125, one or more IPCs 130, and one or more application specific machines 135 (ASM). The various components of the example system 100 can communicate via one or more networks 140 and/or via a direct connection (e.g., a USB-type connection, Bluetooth, WiFi, ethernet, etc.). In some embodiments, one or more components of example system 100 are omitted. For example, embodiments of the present disclosure can omit the server(s) 115, the datastore(s) 120, and/or one or more components of the instrument system(s) 105 (e.g., ASM(s) 135, etc.).

The instrument system(s) 105 can include components for analyzing material samples according to one or more measurement modalities, facilitated by the configurations of the instrument(s) 125 and software, tools, or the like, available on the IPC(s) 130, ASM(s) 135, client computing device(s) 110, and/or server(s) 115. For example, the client computing device(s) 110 and/or server(s) 115 can host software applications configured to implement one or more processing operations using data generated by the instrument(s) 125. The performance of the example system 100 can be improved through segmenting data processing workflows implicated in such processing operations, as described in more detail in reference to the forthcoming FIGS. 2-7.

The client computing device(s) 110 can be or include general purpose (e.g., laptops, tablets, smart phones, desktops, etc.) and/or special purpose computing devices. The server(s) 115 can be or include one or more local and/or remote network connected machines including processing, storage, and/or communication components. In an illustrative example, the server(s) can be co-located with the instrument system(s) 105 in a physical location (e.g., a building, campus, or other location), and can communicate with one or more components of the instrument system(s) 105. The client computing device(s) 110 can be located at a first physical location different from a second physical location of the instrument system(s) 105. To that end, the datastore(s) 120 can be located at the first physical location to store large datasets generated by the instrument system(s) 105 and to reduce data transfer latency between the instrument system(s) 105 and the client computing device(s) 110 during periods of relatively high network latency, or, for example, when the first physical location and the second physical location are physically remote (e.g., on different continents or different coasts of the same continent). In some embodiments, network latency and data read/write capacity of the datastore(s) 120 form a part of the system configuration that is used to segment data processing workflows in accordance with embodiments of the present disclosure.

IPC(s) 130 can include general purpose or special purpose computing devices. For example, embodiments include a PC configured for user interaction (e.g., having display, user interaction peripherals, and user interface), a PC dedicated to coordinating the operation of the instrument(s) 125 without direct user interaction (also referred to as a "dedicated" PC) that lacks user interface components, and/or a compute board incorporated into or otherwise operably coupled with the instrument(s) 125. A compute board can include components similar to the dedicated PC, where power circuitry and/or input output components can be shared with the instrument(s) 125 or other elements of the instrument system (s) 105.

Figure 2:
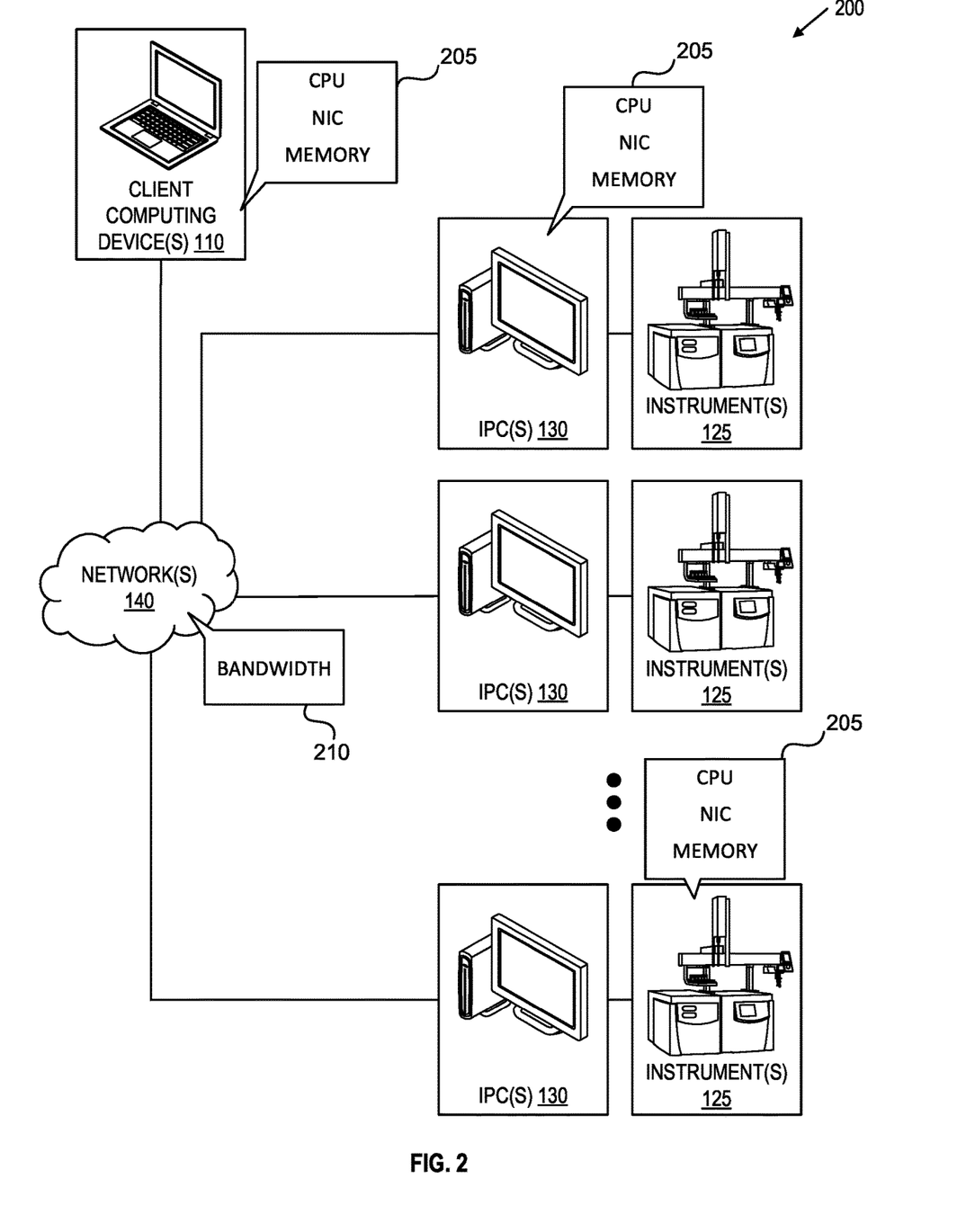
FIG. 2 is a schematic diagram illustrating an example configuration of the example system of FIG. 1, in accordance with some embodiments of the present disclosure.
Figure 3:
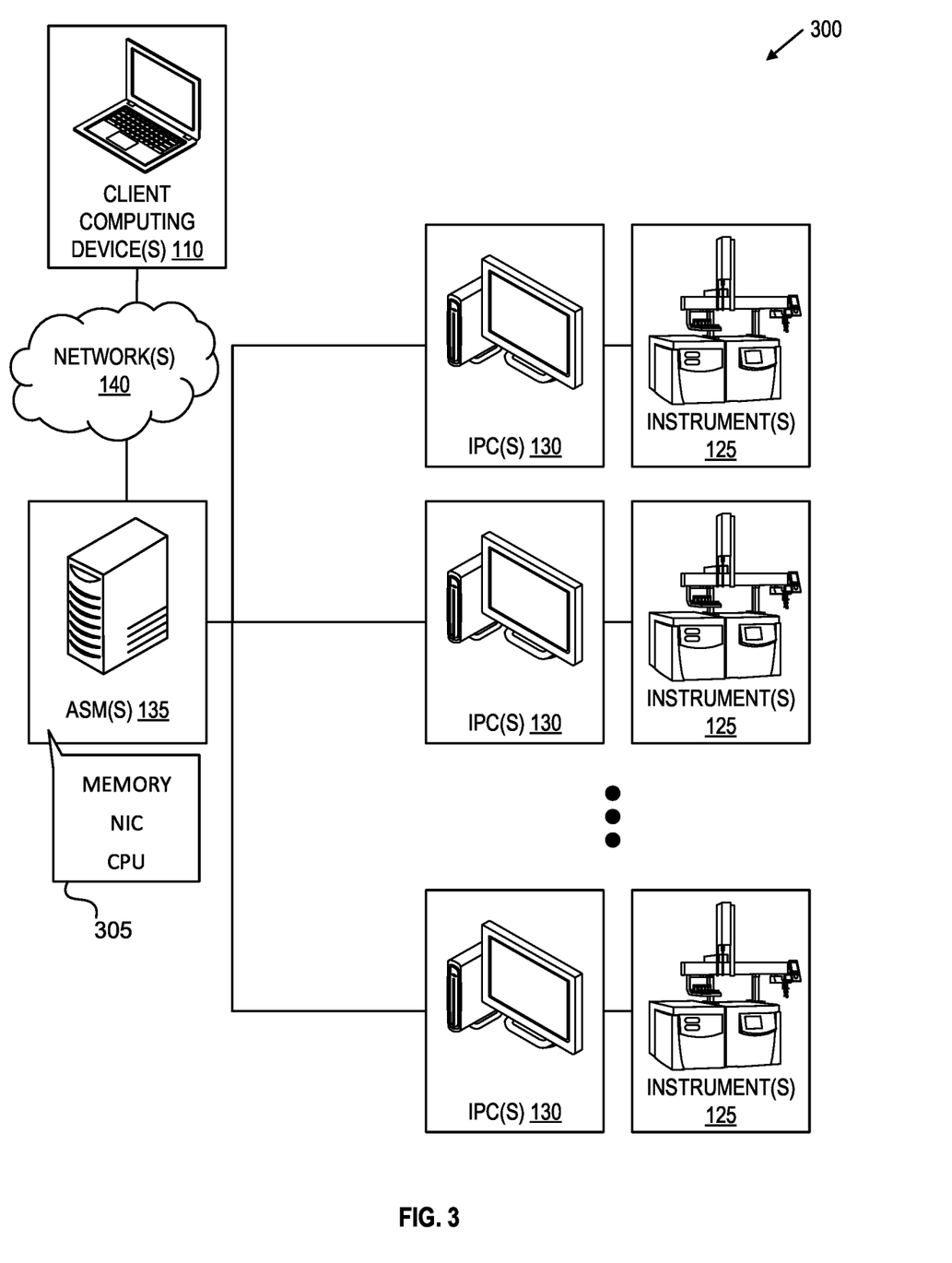
FIG. 3 is a schematic diagram illustrating an example configuration of the example system of FIG. 1 including an application specific machine, in accordance with some embodiments of the present disclosure.

As described in more detail in reference to FIGS. 2-3, a configuration of the components of example system 100 can include metadata corresponding to internal components, performance parameters, and/or current conditions of the IPC(s) 130, including but not limited to network interface component(s) ("NIC"), processing component(s) ("CPU"), and memory/storage component(s) ("MEMORY"). Similarly, the network(s) 140 can be characterized by a bandwidth or other data transfer parameters (e.g., upload rate, download rate, downtime, etc.). In this way, the IPC(s) 130 can be specially configured to transfer large datasets with negligible or no latency. For example, sets of analytical instrument data including millions of datafiles or more can be generated by the instrument system(s) 105. The IPC(s) 130 can be specially configured to process at least a portion of the dataset(s) by applying one or more operations to locally-stored data with negligible or no latency, as part of reducing overall latency of the example system 100. In an illustrative example, the IPC(s) 130 can be configured with special purpose bus circuits and/or large RAM capacity to reduce the latency introduced by locally processing analytical instrument datafiles.

Application specific machine(s) (ASM(s)) 135 can be special purpose computing devices configured to coordinate the operation of the instrument system(s) 105 (e.g., IPC(s) 130 and/or instrument(s) 125) and/or to facilitate communication with other components of the example system 100. For example, the ASM(s) 135 can include similar components as are found in the server(s) 115, client computing device(s) 110, and/or the IPC(S) 130. In some embodiments, the instrument system(s) 105 omit some or all of the IPC(s) 130 and/or server(s) 115, with the ASM(s) 135 performing the function of controlling the instrument(s) 125 and communicating with outside systems (e.g., via the network(s) 140). In the context of the present disclosure, the instrument (s) 125 can include one or more different types of analytical instruments including, but not limited to, spectrometers, chromatography instruments, sequencers, microscopes, or the like. To that end, embodiments of the present disclosure can include systems, methods, algorithms, and software configured to segment data processing workflows for a variety of different instrument systems 105, As described in more detail in reference to FIG. 6.

FIG. 2 is a schematic diagram illustrating an example configuration 200 of the example system 100 of FIG. 1, in accordance with some embodiments of the present disclosure. The example configuration 200 includes communication between the IPC(s) 130 and the client computing device(s) 110 via the network(s) 140, omitting or without using the ASM(s) 135. The example configuration 200 can correspond to an instrument system 105 that does not include an ASM 135 and/or where the ASM 135 is dedicated to or temporarily addressed at other processes. Components of the example system 100 illustrated as part of the example configuration 200 can be respectively characterized by one or more parameters 205. Based at least in part on the parameter(s) 205, constituent operations of a data processing workflow can be segmented between the IPC(s) 130 and the client computing device(s) 110.

As described in more detail in reference to examples 1-3, data processing workflows can include one or more operations by which analytical metadata (e.g., spectral analysis, peak identification, structure identification, visualization data, etc.) can be generated using raw data (e.g., GC-MS data, etc.) originating from sample analysis by the instrument(s) 125. In some embodiments, the parameters 205 can include hardware component specifications, such as CPU configuration (e.g., number of cores, clock speed, architecture, etc.), memory configuration (e.g., capacity, read-write speed, etc.), and network connectivity configuration (e.g., upload/download speed, bandwidth, etc.). In the illustrative example of configuration 200, segmentation of a data processing workflow can be based at least in part on estimating an overall latency of the workflow from individual latency contributions of constituent operations based at least in part on processing parameters 205 and network connectivity parameters 210. As described in more detail in reference to FIGS. 4-5, latency can arise during processing and/or transfer operations of a data processing workflow.

In some embodiments, models and/or algorithms are encoded in software to implement segmentation of data processing workflows based at least in part on the example configuration 200. For example, a rules-based model can take in the parameter(s) 205 of the various components of the example system 100 included in example configuration 200. Using the parameter(s) 205, the model can generate a latency for a given data processing workflow as an output. In this way, the software can include instructions that, when executed by the client computing device(s) 110, cause the client computing device(s) 110 to access, request, retrieve, or otherwise reference the parameter(s) 205 and use the parameter(s) 205 to estimate latency contributions for constituent operations of a given data processing workflow.

FIG. 3 is a schematic diagram illustrating an example configuration 300 including an application specific machine 135, in accordance with some embodiments of the present disclosure. The example configuration 200 includes communication between the IPC(s) 130 and the client computing device(s) 110 via the network(s) 140 using the ASM(s) 135 to coordinate communication of multiple IPCs 130 with the client computing device(s) 110. The example configuration 300 can correspond to an instrument system 105 that includes an ASM 135 as part of the instrument system 105 and/or where the ASM 135 is dedicated to or temporarily addressed at coordinating the operation of the IPCs 130, processing data generated by the instruments 125, and/or communicating data between the instrument system 105 and the client computing device(s) 110. As described in more detail in reference to FIG. 2, components of the example system 100 illustrated as part of the example configuration 300 can be respectively characterized by one or more parameters 205 and 210. The ASM, in turn, can be characterized by one or more parameters 305. Based at least in part on the parameter(s) 205, 210 and 304, constituent operations of a data processing workflow can be segmented between the ASM(s) 135, the IPCs 130 and the client computing device(s) 110.

Figure 4:
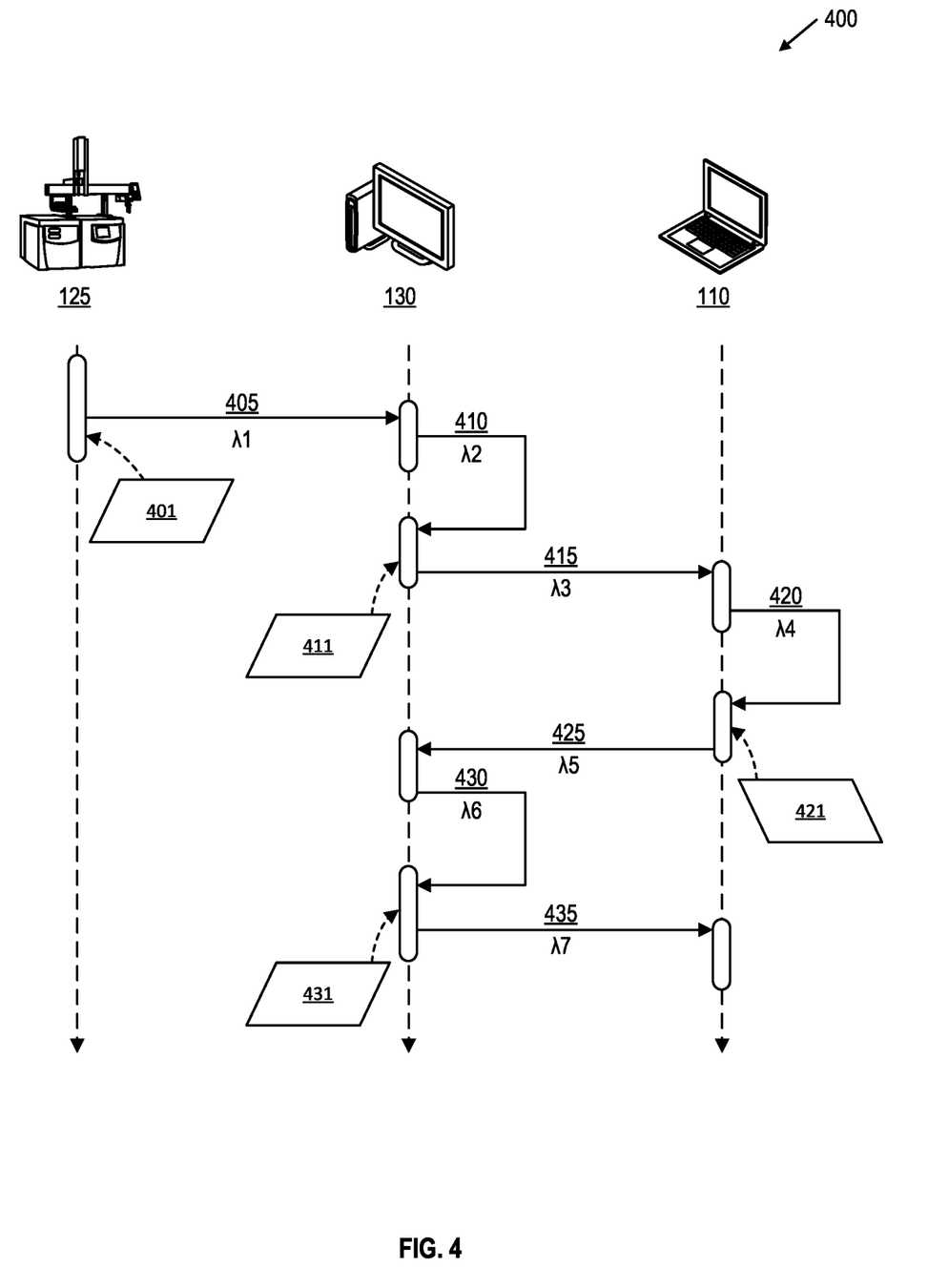
FIG. 4 is a schematic diagram illustrating an example data processing workflow for the example system of FIG. 1 configured as illustrated in FIG. 2, in accordance with some embodiments of the present disclosure.

FIG. 4 is a schematic diagram illustrating an example segmented data processing workflow 400 for the example system of FIG. 1 configured as illustrated in FIG. 2, in accordance with some embodiments of the present disclosure. Example sequence 400 illustrates an embodiment where raw instrument data are stored at the IPC(s) 130, rather than being transferred to the client computing device(s) 110. In this way, the client computing device(s) 110 can send and/or receive data from the IPC(s) 130 multiple times in an approach that balances data transfer constraints. The data processing sequence in example workflow 400 can omit one or more operations between constituent components of the example system 100, such as between the client computing device(s) 110, the datastore(s) 120, and/or server(s) 115. The example workflow 400 is illustrated as a linear sequence of operations, where vertical "lanes" indicate the forward direction of time with dashed lines, representing a component identified above each dashed line. Operations of the example workflow 400 can be reordered, repeated, and/or omitted. In some embodiments, one or more operations are gated by a user action (e.g., a user selection of an action via a user interface). Similarly, one or more operations can be gated by the completion of another process and/or operation. The example workflow 400 can be interrupted, concluded, and/or restarted, for example, by user intervention.

The constituent operations of the example workflow 400 include one or more data transfer operations 405, 415, 425, and 435 and one or more data processing operations 410, 420, and 430, applied to data 401, 411, 421, and 431, of various forms. The operations can be associated with a respective latency "a" that can be used as a contribution to an overall latency of the example workflow 400 and/or considered individually when segmenting the example workflow 400 between various components of the example system 100. In an illustrative example, an optimization of the overall latency of the data processing workflow can be a part of the segmentation process that results in the example workflow 400. Examples of the segmented data processing workflows are described in reference to FIG. 6, below.

In some embodiments, data 401 generated by the instrument(s) 125 are transferred to and/or stored by IPC(s) 130 that are directly connected to the instrument(s) 125 as part of sample analysis procedures. For example, where the instrument system 105 includes a GC-MS, data 401 can be or include data cubes having multiple mass spectra organized in association with an elution time at which the mass spectrum was collected, thereby coupling the gas chromatography data with the mass spectrometry data, as illustrated schematically in FIG. 6. Data cubes can include hundreds, thousands, millions, or more spectra, representing very large data files that can be transferred and/or stored relatively quickly on local IPC(s) 130 at transfer operation 405 (e.g., $\lambda 1$ can be relatively short), but where transferring the entirety of data 401 to client computing device(s) 110, either directly from the instrument(s) 125 or from the IPC(s) 130 can be prohibitively slow (e.g., the corresponding latency can be relatively long).

One or more data processing operations 410 can be applied to the data 401 by the IPC(s) 130 to generate data 411 that can be transferred to the client computing device(s) 110 at operation 415. In a simplistic example of workflow optimization, the workflow 400 can be segmented as illustrated where latency contributions $\lambda 2$ and $\lambda 3$ are relatively shorter than a comparable transfer operation for data 401 from IPC(s) 130 to client computing device(s) 110 directly. In some embodiments, latency minimization forms a part of the segmentation techniques, complemented by parallelization, serialization, compression, and other processes that can be applied conditionally as part of improving the overall performance of the data processing workflow. For example, processing operation 410 can include one or more compression operations applied to data 411 to reduce the size of the files to be transferred at operation 415, where network capacity is limited (e.g., dynamically adjusting the example workflow 400). In another example, data 411 can correspond to a portion of the data 401, metadata derived from the data 401, visualization data generated using the data 401 (e.g., interactive graph instructions for a visualization application hosted on the client computing device(s) 110).

The client computing device(s) 110 can implement one or more data processing operations 420 using the data 411 received from the IPC(s) 130. Data processing operations can include generating and/or displaying visualization data (e.g., as an interactive graph), implementing peak fitting or other spectral analysis algorithms, accessing materials spectrum databases to facilitate identification of samples from which the data 401 were generated, or the like. A person of ordinary skill in the art of spectral analysis would understand that analysis of spectral data can include various techniques to identify material, chemical, physical, and/or biological characteristics of sample spectra.

The data 421 generated by the one or more data processing operations can include query data, metadata, and/or processed data that can be transferred to IPC(s) 130 at transfer operation 425. In some embodiments, data processing operations 430 generate new data 431 from the data 401 based at least in part on parameters and/or configurations included as part of the data 421. In an illustrative example, visualization data transferred to the client computing device(s) 110 at operation 415 can be used to identify a range of spectral data for magnification, peak fitting, and species identification. The data 421, therefore, can include spectral bounds (e.g., a range of m/z values, or the like), and other metadata to use when generating the new data 431 at operation 430, which can be transferred back to the clinet computing device(s) 110 at operation 435. In this way, some operations are applied directly to the data 401 generated by the instrument(s) 125, which is stored at the instrument system 105, with smaller data volumes being transferred between the IPC(s) 135 and the client computing device(s) 110 to reduce latency arising from network bandwidth limitations (e.g., between the instrument system(s) 105 and the client computing device(s) 110 and/or the server(s) 115).

In some embodiments, the data 401 are stored as new spectrum files are generated by the instrument(s) 125 and are made available for processing operations. In such cases, data preparation operations applied to the data 401 can include batch transferring from the IPC(s) 130 to the client computing device(s) 110. In this way, latency associated with the operation of the instrument(s) 125 can be reduced by parallelizing data generation and transfer operations. Similarly, where the data 401 are generated as a single dataset, processing operations 410 can include preparation of batches for parallel transfer operations 415 to reduce the latency $\lambda 3$. In this way, segmenting the example workflow 400 can include data preparation operations to structure the data 401 differently from the format in which the data 401 are generated by the instrument(s) 125, as an approach to improving overall performance of the example workflow 400.

Figure 5:
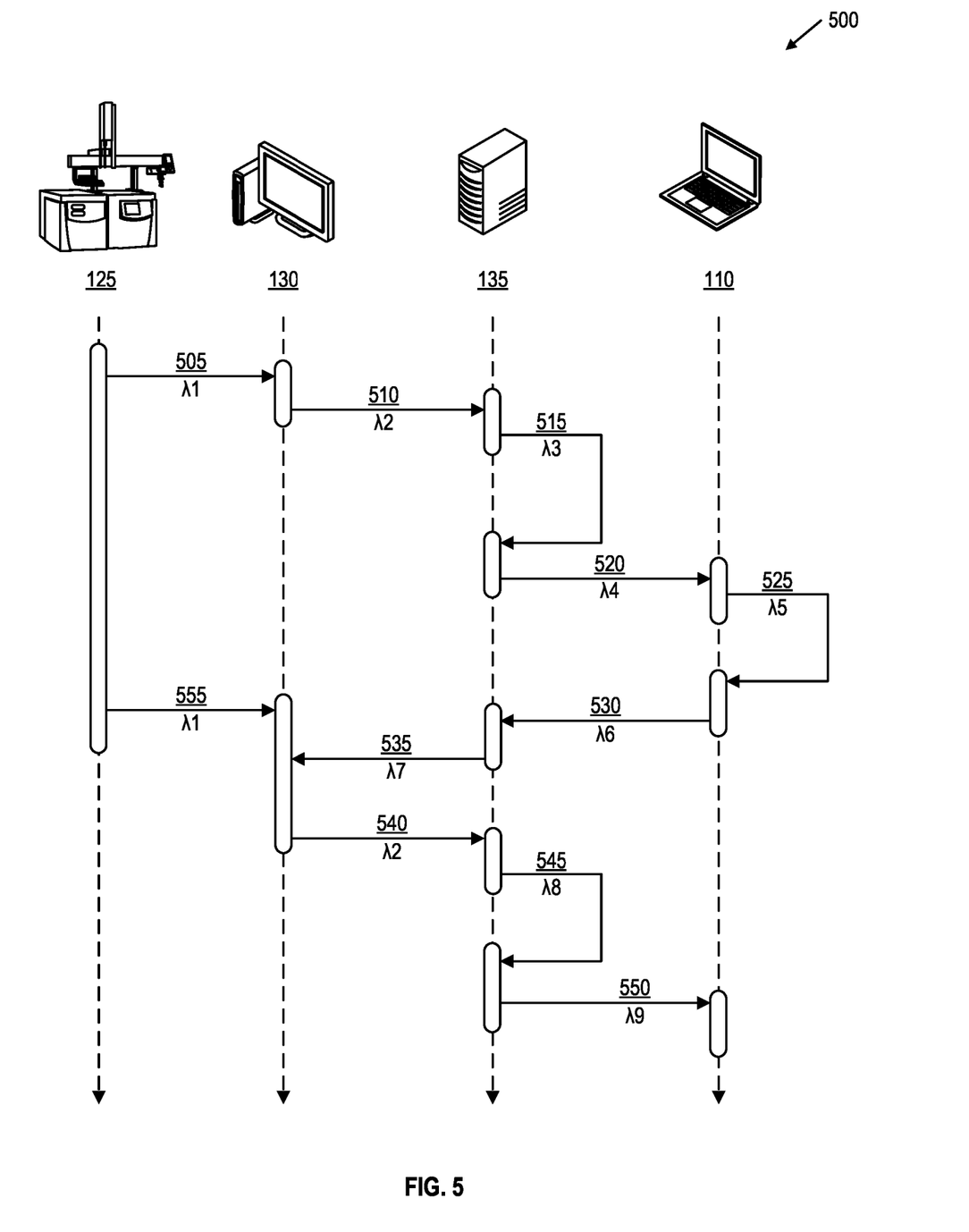
FIG. 5 is a schematic diagram illustrating an example data processing workflow for the example system of FIG. 1 configured as illustrated in FIG. 3, in accordance with some embodiments of the present disclosure.

FIG. 5 is a schematic diagram illustrating an example data processing workflow 500 for the example system of FIG. 1 configured in the example configuration 300 of FIG. 3, in accordance with some embodiments of the present disclosure. In contrast to FIG. 4, example workflow 500 illustrates an embodiment of the present disclosure in which instrument data are transferred from the IPC(s) 130 to the ASM(s) 135, additionally and/or alternatively to being transferred to the client computing device(s) 110 directly. As with FIG. 4, the data processing workflow in the example workflow 500 can omit one or more operations between constituent components of the example system 100, such as between the client computing device(s) 110, the datastore(s) 120, the IPC(s) 130, the ASM(s) 135, and/or the server(s) 115. The example workflow 500 is illustrated as a linear sequence of operations, where vertical "lanes" indicate the forward direction of time with dashed lines, with an image representing a component identified above each dashed line. Operations of the example workflow 500 can be reordered, repeated, parallelized, and/or omitted. In some embodiments, one or more operations are gated by a user action (e.g., a user selection of an action via a user interface). Similarly, one or more operations can be gated by the completion of another process and/or operation. The example workflow 500 can be interrupted, concluded, and/or restarted, for example, by user intervention.

The constituent operations of the example workflow 500 include data transfer operations 505, 510, 520, 530, 540, 550, and 555 and data processing operations 515, 525, and 545, applied to data of various forms. The operations can be associated with a respective latency "a" that can be used as a contribution to an overall latency of the example workflow 500 and/or considered individually when segmenting the example workflow 500 between various components of the example system 100. In an illustrative example, an optimization of the overall latency of the data processing workflow can form at least part of the segmentation technique that results in the example workflow 500. Examples of the segmented data processing workflows are described in reference to FIG. 6, below.

At operation 505, at least a portion of instrument data can be transferred from the instrument(s) 125 to the IPC(s) 130. Rather than transfer data directly from the IPC(s) 130 to the client computing device(s) 110, example workflow 500 introduces the ASM(s) 135 to coordinate the data transfer and/or processing operations between the instrument system(s) 105 and the client computing device(s) 110. In this way, data transfer latencies (e.g., $\lambda 1$, $\lambda 2$, $\lambda 7$, and/or $\lambda 8$) amongst the components of the instrument system(s) 105 can be balanced with the computational resource demand placed on the IPC(s) 130 to coordinate the operations of the instrument(s) 125 (e.g., one IPC 130 to one instrument 125, one IPC 130 to multiple instruments 125, etc.). Further, the ASM(s) 135 can be specifically configured with relatively greater data transfer and/or data processing capacities, in comparison to IPC(s) 125, to shoulder demands placed on instrument system(s) 105 by external queries generated by client computing device(s) 110, and to facilitate segmenting a workflow of multiple data processing operations involved in serving a request by a user of the client computing device(s) 110.

In the example workflow 500, the instrument(s) 125 can generate data that are transferred to the ASM(s) 135 via the IPC(s) 125, at least partially, at operations 505 and 510, each characterized by a respective transfer latency ($\lambda 1$ and $\lambda 2$). The data can be processed by the ASM(s) 135 and/or transferred on to the client computing device(s) 110 at operations 515 and 520. Examples of operations 515 include, but are not limited to, compression, labeling, spectral analysis, spectrum averaging, spectrum processing (e.g., smoothing, denoising, baseline correction, etc.), metadata generation, etc., as also described in reference to FIG. 4. In some embodiments, data are stored at the instrument system(s) 105 and transferred in response to a data request from the client computing device(s) 110.

Data processing at operation 515 can also include generating visualization data, for example, as part of a visual presentation of the instrument data using a display of the client computing device 110. An example of visualization data can include a vectorized graph file including metadata labels that can be used as part of an interactive data presentation environment. In this way, the volume of data transferred at operation 520 can be reduced, relative to transferring raw instrument data, while providing useful and intuitive information to a user of the client computing device 110. In some embodiments, the data generated at operation 515 are accessible via the client computing device(s) 110 and/or the IPC(s) 130, as part of an interactive user environment hosted on either or both components. In this way, components of the example system 100 can include media (e.g., non-transitory machine-readable storage media) storing executable instructions that, when executed by the IPC(s) 130 or the client computing device(s) 110, generate an interactive user environment that presents consistent interactive features on either component and permit a user to initiate one or more data processing workflows (e.g., operation 525) via the user environment that can be segmented based at least in part on the configuration of the various components, as described in more detail in reference to FIGS. 1-3.

Instrument system(s) 105 can be at least partially automated, with an instrument 125 analyzing multiple samples in sequence, for example, using an autosampler apparatus and automation software coordinated by an IPC 130. In this way, operations 530-555 demonstrate that data processing workflows of the present disclosure include repeat operations of data access, data generation, data processing, and/or data transfer. At operation 530, the client computing device 110 initiates an operation that references data not present at the client computing device 110, for example, data generated by the instrument 125 that is available at IPC 130 but not yet transferred to ASM 135. Large datasets, including hundreds of spectra, thousands of spectra, millions of spectra, or more, can be transferred partially in multiple increments to reduce computational resource demand placed on the instrument(s) 125 and the IPC(s) 130. To that end, the example workflow 500 includes generating a request for additional data at operation 530 to ASM 135 and a subsequent request to IPC 130 at operation 535 to transfer the data at operation 540. In some embodiments, the instrument system 105 is configured to omit operation 535. As the data transferred at operation 540 can differ from data requested at operation 530, example workflow 500 can include data processing operation(s) 545 as part of serving the request to the client computing device(s) 110.

Advantageously, example workflow 500 segments operations between components of the example system 100 to reduce latency and serve users of the IPC(s) 130 and/or the client computing device(s) 110 with instrument data with improved system and operational performance. In contrast to an unsegmented workflow, which could include transferring instrument data to client computing devices in large sizes (e.g., 10 GB or more) without pre-processing, example workflows 400 and 500 apply at least a subset of data processing operations locally, at IPC(s) 130 and/or at ASM(s) 135. Processed data can be transferred with significantly reduced demand placed on compute resources and less susceptible to bandwidth limitations introduced by the network(s) 140. As described in more detail in reference to FIG. 7, segmentation can be based at least in part on the configuration of the components in a system (e.g., example system 100 of FIG. 1), as illustrated in FIGS. 2-3, on a workflow-specific basis, as described in several specific examples in reference to FIG. 6.

Figure 6:
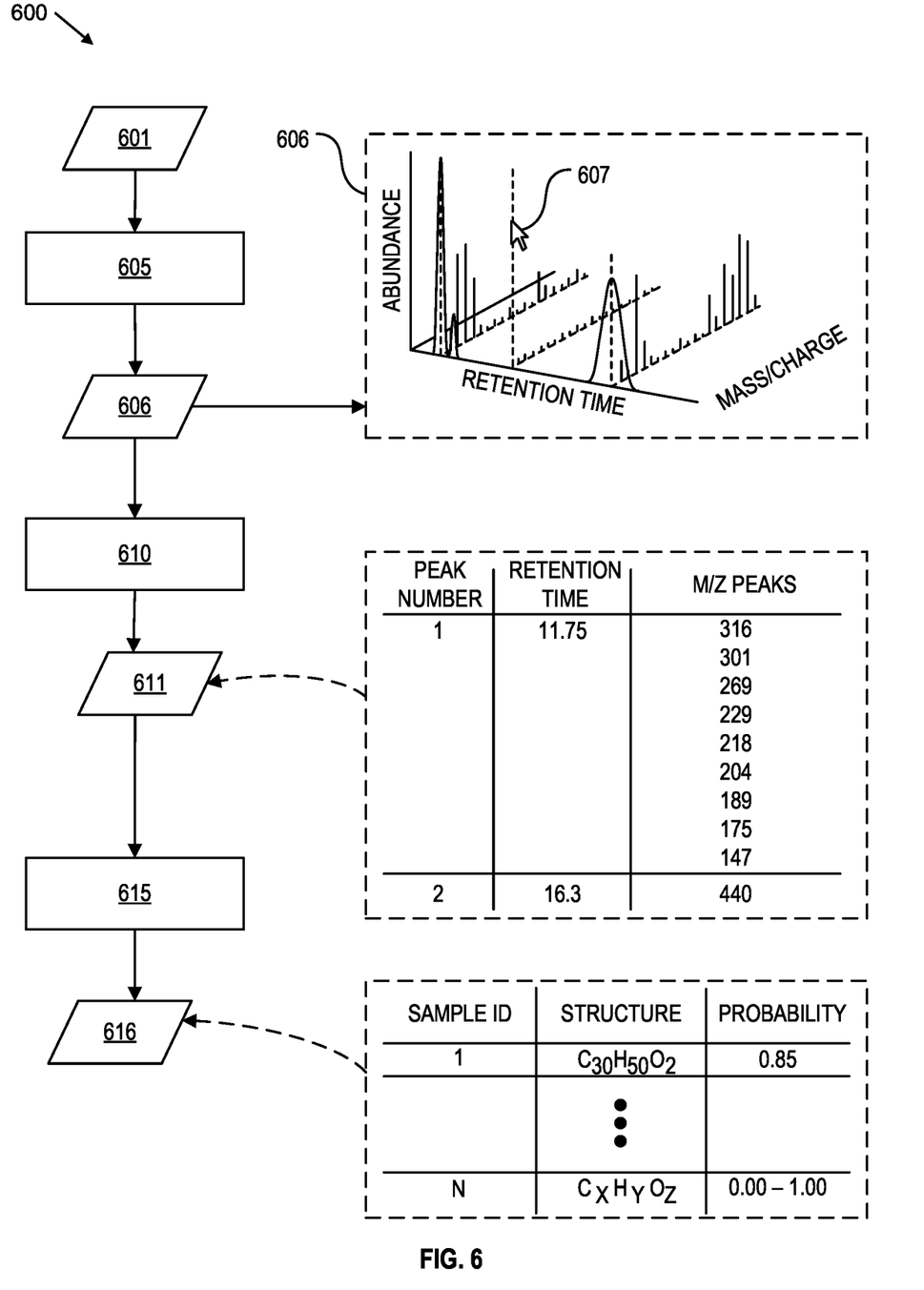
FIG. 6 is a block flow diagram illustrating an example data processing workflow, in accordance with some embodiments of the present disclosure.

FIG. 6 is a block flow diagram illustrating an example data processing workflow 600, in accordance with some embodiments of the present disclosure. The data processing workflow includes one or more processing operations applied to data generated by analytical instruments (e.g., the instrument(s) 125 of the example system 100 of FIG. 1). Data illustrated are a subset of a data cube of GC-MS data, but embodiments of the present disclosure include data from additional and/or alternative analytical techniques, as described in more detail in reference to FIG. 1. The operations of the example workflow 600 are not divided into a segmented workflow, but rather are shown as a sequence of operations unassociated from a particular instrument, computing device, or machine, as an approach to illustrate that data volume differs at various points in the example workflow. In this way, segmenting the example workflow 600 at one or more points can permit relatively small data volumes to be transferred over a network (e.g., where the network is a source of significant latency in the overal workflow) and/or between components in a way that is responsive to user requests while also reducing overall latency and performance penalties, such as delays in sample analysis.

As part of the interactive user environment described in reference to previous figures, a user of the IPC(s) 130 and/or the client computing device(s) 110 can request visualization data 606 to be generated at operation 605. For example, spectrum data 601 can be visualized as a data cube, with mass spectra associated with the corresponding peaks of the chromatogram. In the exemplary visualization data, a mouse cursor 613 is included to indicate that the visualization data 611 can be structured to be interactive as part of the interactive user environment. For example, rather than a static image file or vectorized graphic, the visualization data 606 can be configured for a dynamic graph utility that permits a user of the interactive user environment to select a point on the GC spectrum to view and/or select the corresponding MS spectrum.

At operation 610, instrument data 601 (e.g., data 401 of FIG. 4) is processed to generate averaged spectrum data 611 from a data cube of GC-MS data. For a given sample, a data cube of GC-MS data can include time-series data (e.g., retention time) generated by the gas chromatograph, each entry of which is associated with one or more mass spectra. Examples of averaged spectrum data 611 include where an average mass spectrum is generated for one or more of the elution peaks in the GC spectrum, which can improve signal-to-noise properties, improve accuracy of downstream processing operations, or the like. Additionally, averaged data 606 can include fewer datapoints than instrument data 601, reducing transfer latency. In some embodiments, operations such as operation 610 can be implemented in parallel with data generation by the instrument(s) 125, further reducing overall latency. In the example of GC-MS data, MS data for a first elution peak can be averaged while mass spectra are still being generated.

At operation 615, averaged spectrum data 611 is further processed to analyze mass spectra for identification, for example, based at least in part on ionization patterns and retention time. The results data 616 can include predicted structure identifications, probability or likelihood data, or the like, for one or more samples (e.g., averaged spectrum data 611 can be aggregated for multiple samples). As described in more detail in reference to example 1, the example workflow 600 can be segmented in various ways, based at least in part on the configuration of the system including instrument(s) 125, IPC(s) 130, client computing device(s) 110, and/or ASM(s) 135, etc. (e.g., example system 100 of FIG. 1).

Example 1: Spectrum Averaging of MS Data

MS data (e.g., instrument data 401, 601, etc.) can include original profile signals from a mass spectrometer and/or centroids (referred to as peaks) generated from the profile signals. Peaks can be further analyzed, to see if they may belong to an isotope pattern or be part of a charge envelope. The terms "isotope pattern" and "charge envelope" are given their typical meaning as would be understood by person of ordinary skill in the relevant art.

Algorithms for data processing can be compute intensive, and can tax instrument systems when compute resources are limited. Further, profile data from a mass spectrometer can be noisy. Noise can significantly affect accuracy of calculated centroids from profiles of smaller peaks, which, in turn, can impair the accuracy of sample identification processes. Noisy data can be smoothed and/or denoised by averaging the profiles of a set of scans to reduce noise, and then determining a set of centroids from the averaged profile.

In circumstances where identifications and other such processing are already complete using raw data, smoothed data can be used for calculations that depend on mass determination of the centroids, such as "charge envelopes" or "isotope patterns," at a cost of repeating the computationally expensive processes. Segmenting the corresponding workflow (e.g., example workflow 600 of FIG. 6) can occur in various ways. For example, each of a set of scans (for example, 1-20 scans) are sent from the IPC 130 (or other system which holds the data, such as the ASM 130, datastore 120, etc.) to the client computing device 110 for further processing. This corresponds to a low network latency scenario and/or a relatively high performance client computing device 110, where the instrument data is sent directly to the client computing device 110 from the instrument(s) 125 or IPC(s) 130.

In another scenario, where the instrument data is generated by an instrument system 105 including a relatively high performance compute platform (e.g., IPC(s) 130 and/or ASM(s) 135), compute resource intensive calculations can be performed by the instrument system 105, with the results being sent to the client computing device 110. In this example, the relative importance of network latency or other data transfer latency can be reduced, as processed data volumes can be smaller than raw data volumes.

Similarly, in scenarios where the instrument system 105 and the client computing device 110 and/or the server(s) 115 are similar in terms of compute performance, the role of data transfer latency can become significant, determining at least in part whether computationally expensive processes are performed at the instrument system 105 or the other components. In an example of MS data, averaging can be performed at the data source, such that network traffic is reduced, and averaged spectrum data can be returned to the client computing device 110, which then calculates annotations (e.g., for charges or isotopes).

As described in reference to FIG. 6, the example scenarios described here can form a part of data processing workflow segmentation. As part of processing MS profile data, algorithms making up the workflow (e.g., averaging, labelling, generating visualization data, etc.) can be executed by the instrument system 105 or by the client computing device 110, with the determination of which of the above three scenarios to be adopted to complete the workflow being based at least in part on the configuration of the components and the network.

Example 2: Metadata Analysis

Instrument data is often associated with metadata that allows spectra or other data to be referenced by one or more identifiers to describe a sample, scan, or the like. In the example of mass spectrometry data, metadata can include a label of the type of instrument that generated the data and the precursor mass of the sample, (e.g., "this scan is ms/ms data based on the anaysis of precursor mass 345.678").

Metadata analysis can be useful as part of processing larger datasets. Further, metadata analysis can proceed without transferring the accompanying data. As metadata is often smaller than the scan data that it references, an instrument system 105 can transfer metadata to a client computing device 110, server 115, and/or datastore 120 as part of performing metadata anaysis. In an illustrative example, a client computing device can generate a query to "find all scans which have precursor mass in the range 345.670 to 345.700". Such a query can return a set of metadata referencing spectra files that could be stored in a separate location. Even though metadata are typically small in size, where network latency is significant, it can be more efficient to send batches of these metadata (e.g., about 100 entries at a time) where an instrument has acquired a relatively large number of scans (e.g., about 1000 scans, about 100,000 scans, about one million scans, etc.). In this way, an algorithm to find data in a range can be run on the client computing device 110, referencing data stored at the instrument system 105. Alternatively, data reading and search algorithms can be executed by the instrument system 105 or a data server, such that a more compact result (e.g., a list of matching scans) can be transmitted over a relatively limited bandwidth network.

Example 3: Local Vs. Remote Charting

With complex analytical data, such a mass spectrum that can contain a significant amount of annotation (e.g., charge and/or isotope information as noted above in reference to Example 1), data volume for an entire scan can be relatively large and can take a significant time to transmit over a network. Data visualization, such as generating chart data and/or rendering a mass spectrum as an interactable graph, can be a relatively compute intensive process that generates relatively small data volumes. For example, vector graphics data objects can be relatively small, compared to the data from which the objects are derived, which allows for less data to be transferred over networks for each view, where a new vector graphics object is generated at each request for a new level of data resolution. In some cases, scan data can be sent to the client computing device 110, such that vector data can be generated by the client computing device. In some cases, vector data can be generated by the instrument system 105 and/or the server(s) 115 and sent to the client computing device. As scan data can include complex annotations that can depend on zoom levels, a user action such as "zoom" can implicate a network interaction to generate updated visualization data, for example, to retrieve detailed scan data and annotations at a given zoom level that are unavailable locally at the client computing device 110.

Based at least in part on on network parameters and available compute performance, workflow segmentation can be applied in various ways. For example, where data are already present on the client computing device 110, data processing workflows can be executed entirely on the client computing device 110. In another case, where data are stored at the instrument system 105, data server(s) 115, and/or datastore(s) 120, and are available over a low latency network (e.g., a local area network, or LAN, with <30 ms ping time), data visualization operations can call scan data directly in response to requests received through the interactive user environment. In this way, scan data can be transferred to the client computing device 110 as requested and used to generate vector objects or other visualization data. Additionally and/or alternatively, visualization data can be generated at the instrument system 105 and transferred, where the determination is made at least in part on relative constraints on compute resources.

In another case, scan data are stored on the instrument system and the network 140 is a relatively high latency network (e.g., physically remote or distant network with >300 ms ping). In such cases, data visualization workflows can be segmented to reduce data transfer operations, for example, by generating vector objects at the instrument system 105 or where the scan data are stored, and by generating "previews" in response to zoom requests that are populated with limited annotation data or other metadata while the updated visualization data are generated. Where the client computing device 110 is relatively low performance, data visualization workflows can be segmented to keep all operations at the instrument system 105 and/or the server 115, with relatively few or no operations applied to scan data or visualization data by the client computing device 110. Additionally, interactability of the visualization can be limited in such cases. In this way, embodiments of the present disclosure, based at least in part on system topology and device performance, include determining which segmentation approach results in improved customer experience, improved performance, and/or improved sample analysis.

Figure 7:
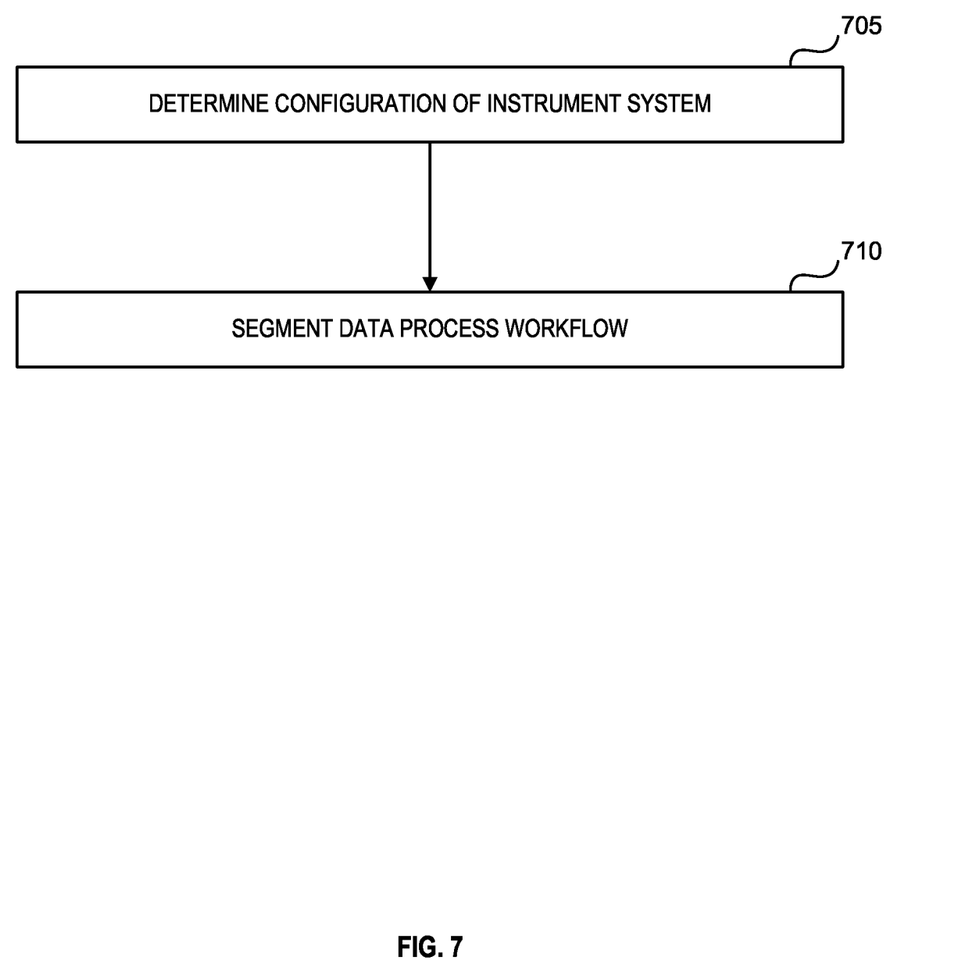
FIG. 7 is a block flow diagram for an example process for segmenting a data process workflow, in accordance with some embodiments of the present disclosure.

FIG. 7 is a block flow diagram for an example process 700 for segmenting a data processing workflow, in accordance with some embodiments of the present disclosure. As described in reference to FIGS. 1-6, one or more operations making up the example process 700 can be executed and/or initiated by a computer system or other machine operably coupled with components of an analytical instrument (e.g., example the instrument(s) 125 of FIG. 1) and/or additional systems or subsystems including, but not limited to, characterization systems, network infrastructure, databases, controllers, relays, power supply systems, and/or user interface devices. To that end, operations can be stored as machine executable instructions in one or more machine readable media that, when executed by the computer system, can cause the computer system to perform at least a portion of the constituent operations of process 700. The constituent operations of process 700 can be preceded by, interspersed with, and/or followed by operation(s) that are omitted from the present description, such as sample and/or instrument preparation, operations that take place prior to operations 705 and 710, or the like, that form at least a part of an analytical method for processing a sample to generate spectral data as illustrated in FIGS. 5A-5B. To that end, operations of the example process 700 can be omitted, repeated, reordered, and/or replaced in some embodiments.

At operation 705, example process 700 includes determining a configuration of an instrument system (e.g., instrument system(s) 105 of FIG. 1). As described in more detail in reference to FIG. 1, the instrument system can include one or more analytical instruments 125 coupled with one or more IPCs 130. The IPC(s) 130 can be configured to receive raw data from the analytical instrument(s) 125, to process the raw data, and to communicate with one or more client computing devices 110 coupled with the instrument system. Determining the configuration can include one or more suboperations. As described in more detail in reference to FIGS. 2-3 the configuration can be based at least in part on a set of parameters describing hardware included in the instrument system (e.g., parameters 205, 210, and 305 of FIGS. 2-3) and/or in communication with hardware included in the instrument system. The hardware can be configured to process data and/or to transfer data between two or more components of the instrument system.

The suboperations of operation 705 can include determining a data processing latency for the instrument system(s), the client computing device(s), and/or the server(s) using the set of parameters describing the components, determining a data transfer latency for the hardware using the list of parameters, and/or determining a network transfer latency between the client computing device(s), the server(s), and/or the instrument system. In this context, the data processing latency can be based at least in part on compute resources available at each respective component of the instrument system, as described in more detail in reference to FIGS. 2-5, and data transfer latency can be based at least in part on communication hardware and performance. For example, systems of the present disclosure can include a database of data processing capacity information and/or data transfer capacity information for the hardware (e.g., datastores 120, or the like). In this way, determining the latency parameters can include querying the database(s). As described in more detail in reference to FIG. 6 and the accompanying examples, determining the network latency can include assessing a data transfer rate between the client computing device and the instrument system over the network (e.g., via a ping or other operation).

In some embodiments, the configuration is updated and/or determined iteratively and/or dynamically. For example, a scheduled update to the configuration can be applied, an update can be triggered as part of implementing one of a set of data processing workflows (e.g., as described in reference to the examples accompanying FIG. 6), where the set can be defined, for example, in a reference or configuration file. Similarly, the configuration can be revised at the start of a sample analysis run by the instrument system. In some embodiments, the configuration is determined dynamically, as an approach to accounting for shifts in network performance and compute resource availability. For example, ASM(s) 135 can be shared between multiple instrument systems 105 (e.g., as in configuration 300 of FIG. 3), such that the compute resource availability and local network traffic can fluctuate. A dynamic configuration update can account for differences between the stated specification of the component and its current state. In some embodiments, the updated configuration and/or latency parameters can be used to modify the segmented data processing workflow.

At operation 710, example process 700 includes segmenting the data processing workflow based at least in part on the configuration. Segmenting the data processing workflow includes attributing at least a subset of constituent operations of the data processing workflow to the client computing device(s) 110, the IPC(s) 130, the ASM(s) 135, and/or the server(s) 115. In some embodiments, segmenting the data processing workflow includes defining a first subset of operations of the data processing workflow to be executed locally on the IPC(s) 130 using the raw data. Segmenting the data processing workflow can also include defining a second subset of operations of the data processing workflow to be executed locally on the client computing device using processed data transferred to the client computing device 110 from the instrument system 105. As described in more detail in reference to FIGS. 4-5, the raw data can include analytical spectrum data, such that the first subset of operations can include implementing one or more spectral analysis algorithms configured to input at least a portion of the raw data and to output the processed data. The processed data can include compressed spectrum data and spectral analysis metadata, As described in more detail in reference to FIGS. 4-6 and the accompanying examples.

In some embodiments, one or more operations of the first subset of operations of the segmented data processing workflow are gated by user interactions via the client computing device(s) 110 and/or the IPC(s) 130. In this way, the second subset of operations can include initiating a data processing operation of the first subset of operations in accordance with receiving a user action via an interactive user environment.

In the preceding description, various embodiments have been described. For purposes of explanation, specific configurations and details have been set forth in order to provide a thorough understanding of the embodiments. However, it will also be apparent to one skilled in the art that the embodiments may be practiced without the specific details. Furthermore, well-known features may have been omitted or simplified in order not to obscure the embodiment being described. While example embodiments described herein center on spectrometry systems, and mass spectrometry systems in particular, these are meant as non-limiting, illustrative embodiments. Embodiments of the present disclosure are not limited to such embodiments, but rather are intended to address analytical instruments systems for which a wide array of material samples can be analyzed to determine chemical, biological, physical, structural, or other properties, among other aspects, including but not limited to chemical structure, trace element composition, or the like.

Some embodiments of the present disclosure include a system including one or more data processors and/or logic circuits. In some embodiments, the system includes a non-transitory computer readable storage medium containing instructions which, when executed on the one or more data processors and/or logic circuits, cause the one or more data processors to perform part or all of one or more methods and/or part or all of one or more processes and workflows disclosed herein. Some embodiments of the present disclosure include a computer-program product tangibly embodied in a non-transitory machine-readable storage medium, including instructions configured to cause one or more data processors and/or logic circuits to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the claims. Thus, it should be understood that although the present disclosure includes specific embodiments and optional features, modification and variation of the concepts herein disclosed may be resorted to by those skilled in the art, and that such modifications and variations are considered to be within the scope of the appended claims.

Where terms are used without explicit definition, it is understood that the ordinary meaning of the word is intended, unless a term carries a special and/or specific meaning in the field of analytical instrument systems or other relevant fields. The terms "about" or "substantially" are used to indicate a deviation from the stated property within which the deviation has little to no influence of the corresponding function, property, or attribute of the structure being described. In an illustrated example, where a dimensional parameter is described as "substantially equal" to another dimensional parameter, the term "substantially" is intended to reflect that the two parameters being compared can be unequal within a tolerable limit, such as a fabrication tolerance or a confidence interval inherent to the operation of the system. Similarly, where a geometric parameter, such as an alignment or angular orientation, is described as "about" normal, "substantially" normal, or "substantially" parallel, the terms "about" or "substantially" are intended to reflect that the alignment or angular orientation can be different from the exact stated condition (e.g., not exactly normal) within a tolerable limit. For dimensional values, such as diameters, lengths, widths, or the like, the term "about" can be understood to describe a deviation from the stated value of up to ±10%. For example, a dimension of "about 10 mm" can describe a dimension from 9 mm to 11 mm.

The description provides exemplary embodiments, and is not intended to limit the scope, applicability or configuration of the disclosure. Rather, the ensuing description of the exemplary embodiments will provide those skilled in the art with an enabling description for implementing various embodiments. It is understood that various changes may be made in the function and arrangement of elements without departing from the spirit and scope as set forth in the appended claims. Specific details are given in the description to provide a thorough understanding of the embodiments. However, it will be understood that the embodiments may be practiced without these specific details. For example, specific system components, systems, processes, and other elements of the present disclosure may be shown in schematic diagram form or omitted from illustrations in order not to obscure the embodiments in unnecessary detail. In other instances, well-known circuits, processes, components, structures, and/or techniques may be shown without unnecessary detail.

What is claimed is:

1. A computer-implemented method for segmenting data processing workflows, the method comprising:

determining a configuration of an instrument system, the instrument system including an analytical instrument coupled with an instrument PC (IPC), the IPC being configured to receive raw data from the analytical instrument, to process the raw data, and to communicate with a client computing device coupled with the instrument system; and segmenting a data process workflow based at least in part on the configuration, attributing at least a subset of constituent operations of the data process workflow to the client computing device or the IPC, the segmenting comprising:
 defining a first subset of operations of the data process workflow, wherein the first subset of operations is executed locally on the IPC using the raw data; and
 defining a second subset of operations of the data process workflow, wherein the second subset of operations are executed locally on the client computing device using processed data transferred to the client computing device from the instrument system.

2. The computer-implemented method of claim 1, wherein the raw data comprises analytical spectrum data, and wherein the first subset of operations comprises implementing one or more spectral analysis algorithms configured to input at least a portion of the raw data and to output the processed data, the processed data comprising compressed spectrum data and spectral analysis metadata.

3. The computer-implemented method of claim 1, wherein the second subset of operations comprises in accordance with receiving a user action via an interactive user environment, initiating a data processing operation of the first subset of operations.

4. The computer-implemented method of claim 1, wherein determining the configuration of the instrument system comprises:
 generating a set of parameters describing components of the instrument system, the parameters describing hardware included in the instrument system being configured to process data or to transfer data between two or more components of the instrument system;
 determining a data processing latency for the instrument system using the set of parameters;
 determining a data transfer latency for the instrument system using the set of parameters; or
 determining a network latency between the client computing device and the instrument system.

5. The computer-implemented method of claim 1, further comprising:
 generating an updated configuration of the instrument system;
 generating an updated latency parameter using the updated configuration; and
 modifying the segmented data process workflow using the updated latency parameter.

6. The computer-implemented method of claim 1, wherein the instrument system further comprises an application specific machine (ASM), operably coupled with the IPC and the client computing device, and wherein segmenting the data process workflow further comprises attributing at least a third subset of the operations included in the data process workflow to the ASM.

7. The computer-implemented method of claim 4, wherein determining the data processing latency comprises querying a database storing data processing capacity information for hardware.

8. The computer-implemented method of claim 4, wherein determining the data transfer latency comprises querying a database storing data transfer capacity information for the hardware.

9. The computer-implemented method of claim 4, wherein determining the network latency comprises assessing a data transfer rate between the client computing device and the instrument system.

10. One or more non-transitory machine-readable storage media storing instructions that, when executed by a machine, cause the machine to perform operations for segmenting data processing workflows, the operations comprising:
 determining a configuration of an instrument system, the instrument system including an analytical instrument coupled with an instrument PC (IPC), the IPC being configured to receive raw data from the analytical instrument, to process the raw data, and to communicate with a client computing device coupled with the instrument system; and
 segmenting a data process workflow based at least in part on the configuration, attributing at least a subset of constituent operations of the data process workflow to the client computing device or the IPC, wherein the raw data is retained in the instrument system, the segmenting comprising:
  defining a first subset of operations of the data process workflow, wherein the first subset of operations is executed locally on the IPC using the raw data; and
  defining a second subset of operations of the data process workflow, wherein the second subset of operations are executed locally on the client computing device using processed data transferred to the client computing device from the instrument system.

11. The one or more non-transitory machine-readable storage media of claim 10, wherein the raw data comprises analytical spectrum data, and wherein the first subset of operations comprises implementing one or more spectral analysis algorithms configured to input at least a portion of the raw data and to output the processed data, the processed data comprising compressed spectrum data and spectral analysis metadata.

12. The one or more non-transitory machine-readable storage media of claim 10, wherein the second subset of operations comprises, in accordance with receiving a user action via an interactive user environment, initiating a data processing operation of the first subset of operations.

13. The one or more non-transitory machine-readable storage media of claim 10, wherein determining the configuration of the instrument system comprises:
 generating a set of parameters describing components of the instrument system, the parameters describing hardware included in the instrument system being configured to process data or to transfer data between two or more components of the instrument system;
 determining a data processing latency for the instrument system using the set of parameters;
 determining a data transfer latency for the instrument system using the set of parameters; or
 determining a network latency between the client computing device and the instrument system.

14. The one or more non-transitory machine-readable storage media of claim 10, further comprising:
 generating an updated configuration of the instrument system;
 generating an updated latency parameter using the updated configuration; and
 modifying the segmented data process workflow using the updated latency parameter.

15. The one or more non-transitory machine-readable storage media of claim 10, wherein the instrument system further comprises an application specific machine (ASM), operably coupled with the IPC and the client computing device, and wherein segmenting the data process workflow further comprises attributing at least a third subset of the operations included in the data process workflow to the ASM.

16. The one or more non-transitory machine-readable storage media of claim 13, wherein determining the data processing latency comprises querying a database storing data processing capacity information for the hardware.

17. The one or more non-transitory machine-readable storage media of claim 13, wherein determining the data transfer latency comprises querying a database storing data transfer capacity information for the hardware.

18. The one or more non-transitory machine-readable storage media of claim 13, wherein determining the network latency comprises assessing a data transfer rate between the client computing device and the instrument system.

* * * * *